United States Patent [19]

Knowles et al.

[11] Patent Number: 4,519,726

[45] Date of Patent: May 28, 1985

[54] FLOW LINE RISER FOR OFFSHORE STRUCTURE

[75] Inventors: John P. Knowles, Johnshaven; Steven A. Wheeler, Westhill; Stewart D. Mitchell, Udny Green, all of Scotland

[73] Assignee: Texaco Limited, London, England

[21] Appl. No.: 557,786

[22] Filed: Dec. 5, 1983

[51] Int. Cl.³ .......................... E02B 17/00; E21B 7/12
[52] U.S. Cl. .................................... 405/195; 405/169; 405/225
[58] Field of Search ............... 405/169, 195, 224, 225, 405/227; 166/344, 347, 367; 175/5, 9

[56] References Cited

U.S. PATENT DOCUMENTS

| | | | |
|---|---|---|---|
| 3,434,296 | 3/1969 | Otteman et al. | 405/169 X |
| 3,685,300 | 8/1972 | Mott et al. | 405/227 |
| 4,023,371 | 5/1977 | Bryant | 405/169 |
| 4,279,542 | 7/1981 | Lewis | 405/169 |

*Primary Examiner*—David H. Corbin
*Attorney, Agent, or Firm*—Robert A. Kulason; Robert B. Burns

[57] ABSTRACT

Riser for an offshore marine platform which includes facilities to receive, treat, and/or store hydrocarbon fluid from a plurality of dispersed submerged wells. The riser includes means to accommodate a plurality of conduits between the platform deck and the floor of the body of water. As a rigid, or non-rigid conduit is pulled downwardly through the riser, it engages a deflecting shoe. The latter deflects the pulled conduit into a direction away from the platform and along the ocean floor, whereby it can readily engage a pipeline, or attach to one of the dispersed wells.

18 Claims, 8 Drawing Figures

FLOW LINE RISER FOR OFFSHORE STRUCTURE

BACKGROUND OF THE INVENTION

In any offshore, hydrocarbon containing field such as one holding crude oil or gas, normally at least one platform or marine structure is installed at a judicious location within the known bounds of the field. The primary functions of such a platform are at least twofold. Operationally, it serves as a base for drilling the needed number of wells into the subterranean reservoir to tap into the stored hydrocarbons. Secondly it functions to receive, treat, and store hydrocarbons which are conducted from other wells within the same field.

Normally the other wells are dispersed about the field at sites where it is determined that the hydrocarbon source can be readily reached. Thus, any productive field will usually contain numerous wells disposed about the ocean floor at various distances from the main platform.

In either instance, each dispersed well is provided with a well head which is capable of regulating the flow of hydrocarbons therethrough. Further, each well is provided with a flow or pipeline which communicates the well with the main platform or with a supplementary fluid storing facility.

It is desirable in the instance of any offshore marine platform, that it be initially designed and fabricated to accommodate a predictable number of wells which will be drilled from the structure. This determination can be initially made only within specific limitations. However, subsequent to the platform being submerged and set at a working site, it cannot always be adjusted or modified to accommodate varying operating conditions which arise or develop over an extended period of time.

For example, the usual drilling type offshore platform is normally provided with a number of vertical drilling conductors. The latter extend from the platform deck to the ocean floor whereby to accommodate and guide a drill string. These conductors are preplaced within the platform and are supported by the jacket in such manner to be available to the movable drilling derrick and equipment, as well as to permit the maximum number of wells to be drilled.

As mentioned, the platform must also accommodate flow lines which communicate the dispersed various well heads with the separating and storage equipment on the platform itself. However, provision is not always made during the initial fabrication and installation of the structure to accommodate the total number of flow lines which will eventually be required. Each platform is provided nonetheless with a sufficient number of drilling conductors in contemplation of the subsequent drilling of wells or the connecting of flow lines which had not been initially planned for.

As a matter of practicality, the drilling conductors which comprise a relatively heavy walled steel tubing, are normally driven into the ocean floor and only receive lateral support from the jacket. The drilling conductors therefore normally extend for a considerable distance into the substrate beneath the platform.

What is presently provided is a means whereby the platform's drilling conductors can be adapted to and utilized for accommodating needed hydrocarbon carrying flow lines. This is achieved by altering one or more of the drilling conductors in situ subsequent to their installation at the operating site.

Physically, the platform jacket is adjusted by severing at least one of the drilling conductors at a point adjacent to the ocean floor. The parted conductor segments are then axially separated a sufficient distance to allow insertion of a prefabricated conduit bending segment into the formed gap.

The inserted segment is fastened into, and becomes integral with the conductor. A baffle means which is thereafter inserted into the conductor upper end defines discrete passages to accommodate a plurality of flexible flow lines or conduits which will subsequently be inserted to extend from the ocean floor to the platform's deck.

The baffle means is so positioned within the modified conductor to fix the relative positions of the various conduits. The baffle thereby precludes said conduits from becoming entangled or even certain ones from coming in contact one with the other.

It is therefore an object of the invention to provide a marine platform adapted to be altered after being installed at an offshore site, to accommodate a plurality of hydrocarbon carrying flow lines and necessary control lines.

A further object is to provide a marine platform or structure of the type contemplated, which is capable of being modified after being installed within a body of water thus to accommodate a greater volume of hydrocarbon flow.

A still further object is to provide a conduit deflecting means within a riser on a marine structure, which permits the insertion of flow lines between the structure's deck and the ocean floor in response to the need for added flow capacity.

DESCRIPTION OF THE DRAWINGS

Referring to FIG. 1 of the drawings, a marine platform or structure 10 of the type presently contemplated is shown positioned at an offshore body of water. The structure is judiciously located to best produce a hydrocarbon containing field or reservoir within the underlying substrate. The platform includes primarily a deck 11 which is normally positioned 50 to 85 feet beyond the water level.

Figure 1:
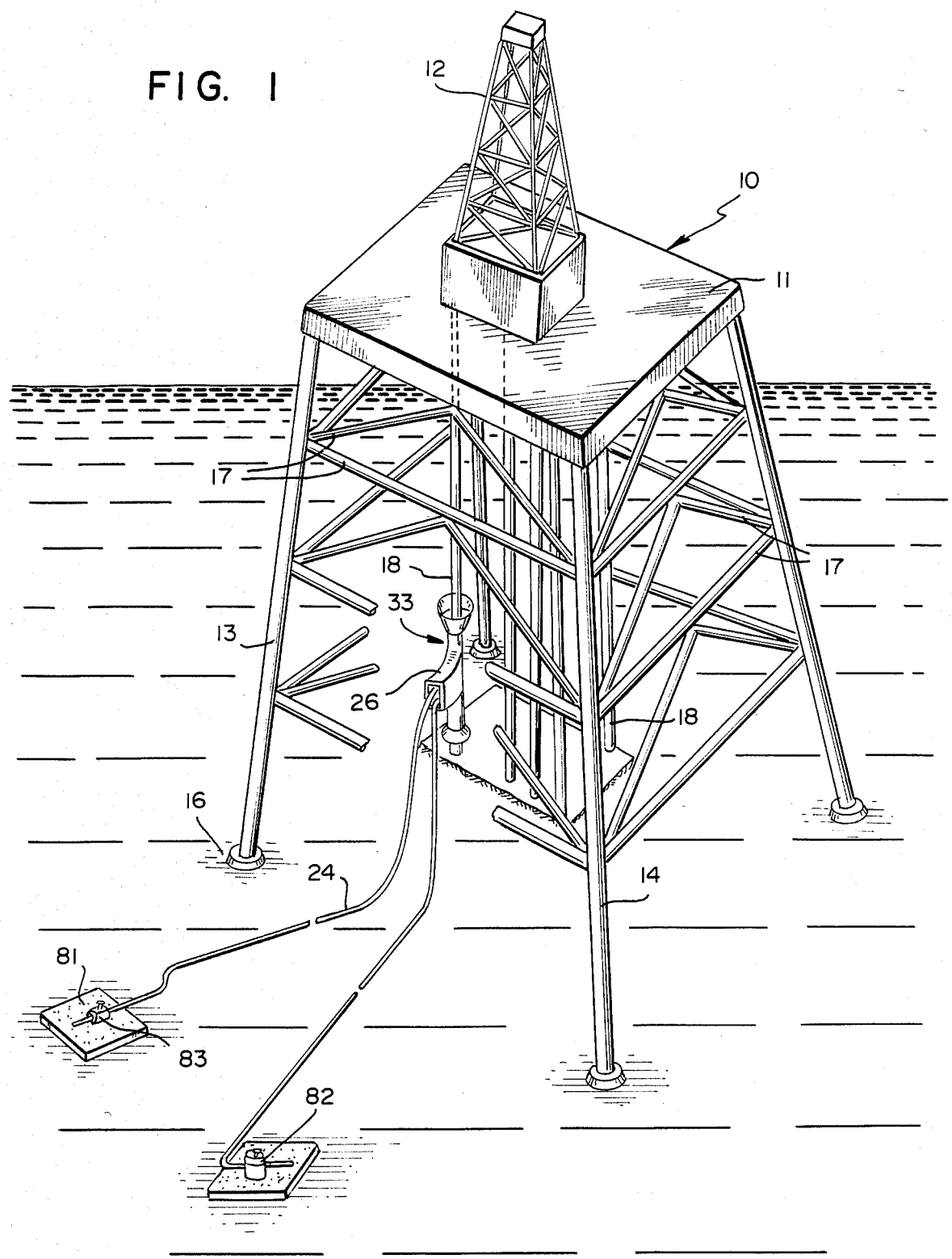
FIG. 1 is a vertical elevation view of a marine platform at an offshore site.

Deck 11 in the usual manner, will accommodate the means for drilling wells, receiving produced hydrocarbons, and housing personnel necessary to operate the facility.

As shown, deck 11 in the present instance includes at least one upstanding derrick 12 of the type which is normally utilized in any offshore well drilling operation. While not shown in specific detail, deck 11 further includes storage means such as tanks, separators, and other facilities whereby the liquid and gaseous hydrocarbons can be initially treated and stored before being transshipped to shore. The latter can be achieved through the use of pipelines which extend from the platform 10 to the shore. Alternately, tankers and other cargo carrying vessels capable of loading at the platform can be utilized to convey the hydrocarbon fluid.

Deck 11 is positioned at a desired elevation above the water's surface by a support superstructure or jacket comprised of tubular steel elements. The latter are designed to accommodate the overall weight of deck 11 and the ancillary equipment, as well as to resist the adverse natural forces such as wind and waves which will be encountered at the particular offshore site.

Thus, the various superstructure members define primarily a series of elongated legs 13 and 14 which extend from deck 11 down to the ocean floor 16. A series of cross members 17 comprise a reinforcing system to supplement the function of the respective support legs.

To accommodate multiple drilling operations which are contemplated from platform 10, one embodiment of the drill string guide, or conductor system comprises a plurality of conductor assemblies 18 which extend from deck 11 down to the ocean floor 16. Each conductor assembly 18 comprises primarily an upright tubular element driven into the seabed with horizontal support provided by vertically spaced conductor guides.

The standard drill conductor 18, either alone or in a conductor assembly, generally comprises a relatively heavy wall pipe having a diameter of approximately 26 inches. Each conductor can be supported at a plurality of points along its length by properly positioning vertically spaced guides or the like which depend from the jacket.

To most effectively utilize the respective drill conductors 18, the latter are driven from the platform deck 11, into the substrate. They are embedded a sufficient distance to support vertical conductor loads and assure a safe drilling operation.

Referring again to FIG. 1, the lower part of conductor 18 has been altered and is provided with a conduit deflecting segment or insert 23, from which a plurality of conduits and lines 24 are shown emerging and lying on the ocean floor. These various lines are preferably in the form of flexible conduits although they can be in the form of rigid, though yieldable wall pipes. One form of conduit adapted to this usage is the "Coflexip" type, which is both flexible and pressure containing.

In either instance, during installation, the cables or conduits 24, while being pulled downwardly, are deflected outwardly from a generally vertical path, to be drawn along the ocean floor a desired distance. Eventually, the respective lines or conduits are connected to a remote well head to receive a hydrocarbon fluid flow therefrom, or to carry control lines thereto.

In the latter embodiment, the downwardly passing conduits 24 can include control members such as electrical cables or the like, which are utilized in the remote operation and control of the well heads. In either instance the respective conduits and lines are normally pulled downwardly through discrete passages in conductor 18 in a manner to avoid possible crimping, bending, or even contact between the various parallel members.

Figure 2:
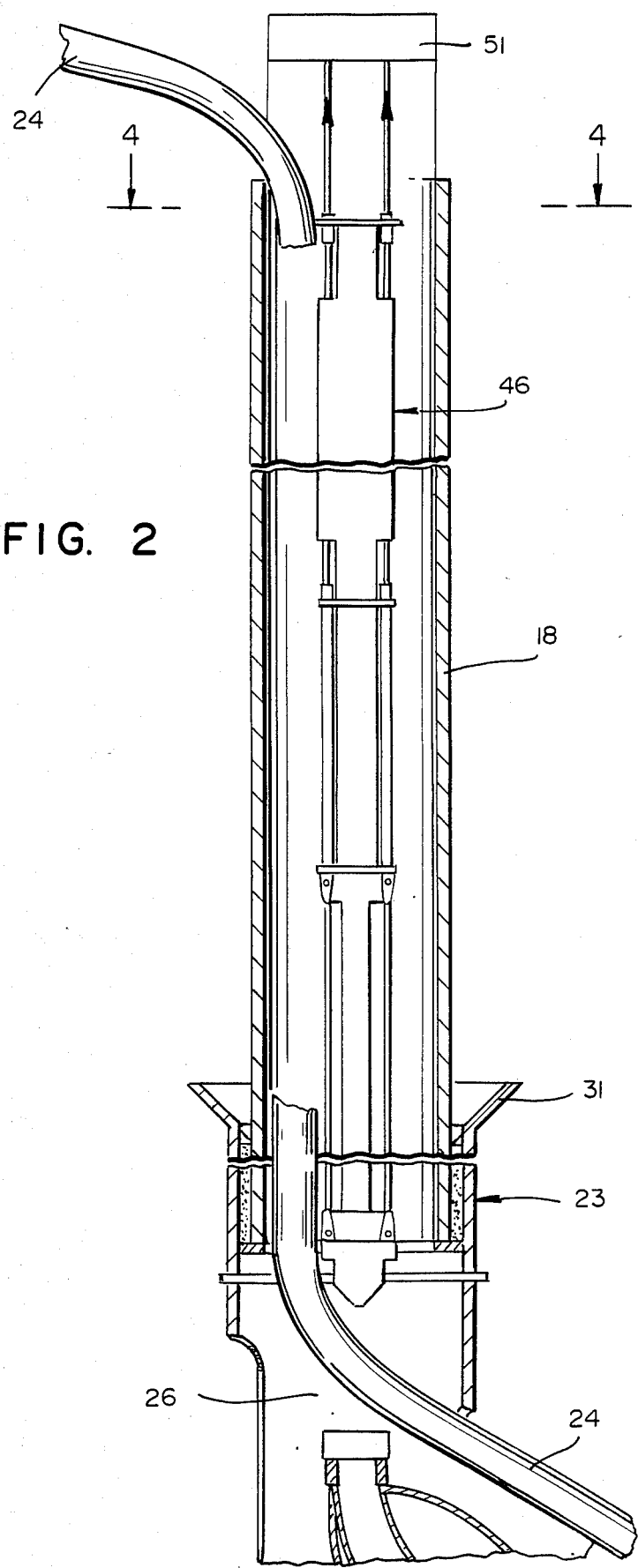
FIG. 2 is a segmentary view on an enlarged scale and in cross-section showing a portion of the platform of FIG. 1.
Figure 3:
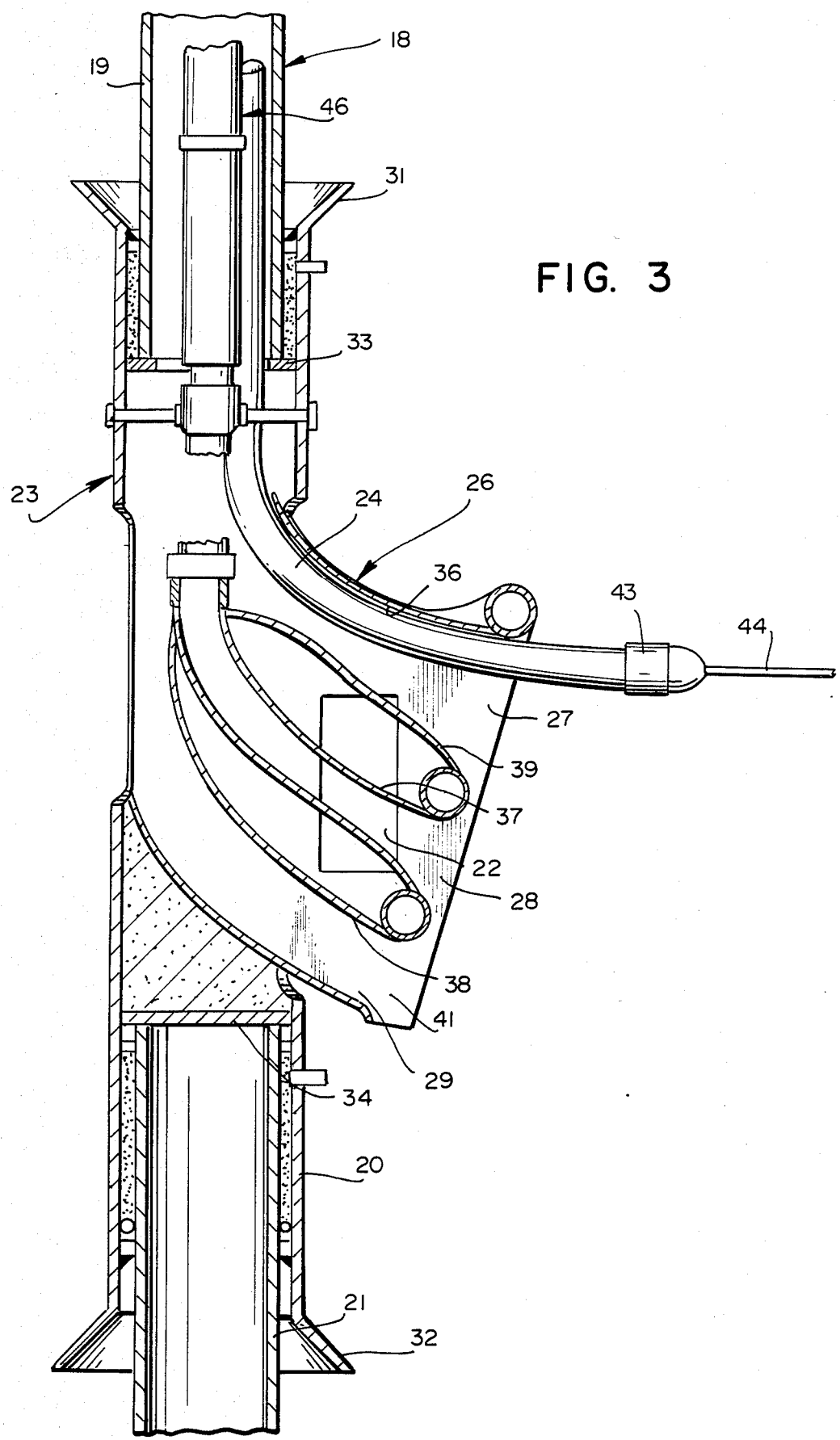
FIG. 3 is similar to FIG. 2.

Referring to FIGS. 2 and 3, bending or deflecting shoe 26 which depends from insert 23 at the lower end of the conductor 18, is comprised of a plurality of vertically spaced outlet ports 27, 28 and 29. The latter as will be herein noted, communicate with inlet openings at the upper end of the deflecting shoe. Each inlet of the latter is disposed to intercept and divert or deflect a downwardly moving conduit to urge it into an outward direction prior to reaching ocean floor 16.

As further shown in FIGS. 2 and 3, conductor 18 upper and lower segments 19 and 21, are maintained apart by insert segment 23. The latter comprises in essence a cylindrical member approximately 9 meters long, having a diameter greater than the diameter of the conductor 18.

Normally for a drilling operation of the type contemplated, conductor 18 would comprise a tubing about 26 inches in diameter. The insert segment 23, however, is approximately 36 inches outside diameter. The upper and lower ends of said segment 23 are provided with flared conical collars 31 and 32 respectively which facilitate the assembly or integration thereof with conductor 18, as will hereinafter be noted.

Insert segment 23 upper section 25 is sufficiently large to permit slidable registry over conductor 18 upper section 19 and into abutment with internal peripheral support ring 33. The latter is welded to the inner wall of segment 23 a sufficient distance from collar 31 to assure an adequate overlap of the two concentrically arranged members. To maintain the integrity of the unit, the annulus between the respective registered conductor segments 9 and 21, and the deflecting insert segment 23, are grouted into solid joints.

In a similar arrangement, the lower section 20 of deflecting insert segment 23 is provided with an internal ring or plate 34 which abuts the severed end of conductor 21 when said segment 23 is slidably registered over said end. Thus, vertical forces which are applied to conductor 18 during normal usage, are transferred entirely therethrough an are borne by the subsoil, by way of inserted segment 23.

The wall of deflecting segment 23 as noted, is provided with an enlarged lateral opening into which a plurality of curved plates which make up the deflecting shoe 26, are fixedly inserted. Said deflecting shoe includes in the present instance at least three curved surface plates 36, 37 and 38 disposed one above the other. Said surfaces are positioned in such a manner that each will intercept and deflect and support a downwardly pulled conduit 24.

The respective curved surfaces or plates 36, 37 and 38 extend transversely of the deflecting shoe assembly and are mutually held between a pair of spaced apart upright side panels, only 41 being shown. One or both of said side panels can be provided with a closure 22 to permit access to the deflecting shoe interior. The entire assembly is fastened in place within insert 23 by welding, bolting or other suitable means.

The upper or inlet ends of the respective curved conduit deflecting surfaces terminate in position to slidably engage a conduit 24 which is being pulled downward by a cable 44 and pulling head 43. Thus, as pulling cable 44 is drawn through upper opening 27, it will cause conduit 24 to slidably bear against curved surface 36 prior to leaving the deflecting shoe.

When the lower end of conduit 24 has reached its desired position and pulling cable 44 and head 43 are removed, conduit 24 will rest against the lower support surface 39. It will then assume a natural supported disposition on the ocean floor 16.

CONDUIT BAFFLE

The multiple conduits 24 which are positioned in conductor 18 will usually be of varying sizes. It is desirable therefore to position them in a manner to make maximum use of the conductor space available. Further, by positioning the respective conduits in an orderly arrangement, they can be tightly packed and will present minimal resistance to being drawn through the conductor length during installation.

Figure 4:
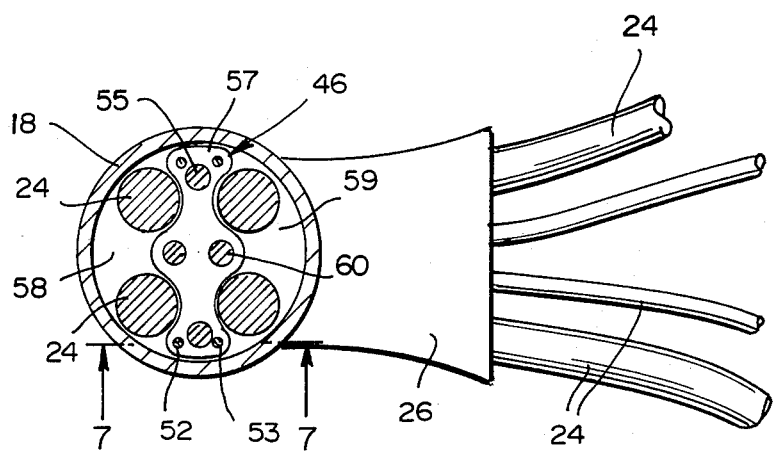
FIG. 4 is a sectional view taken along line 4—4 of FIG. 2.
Figure 5:
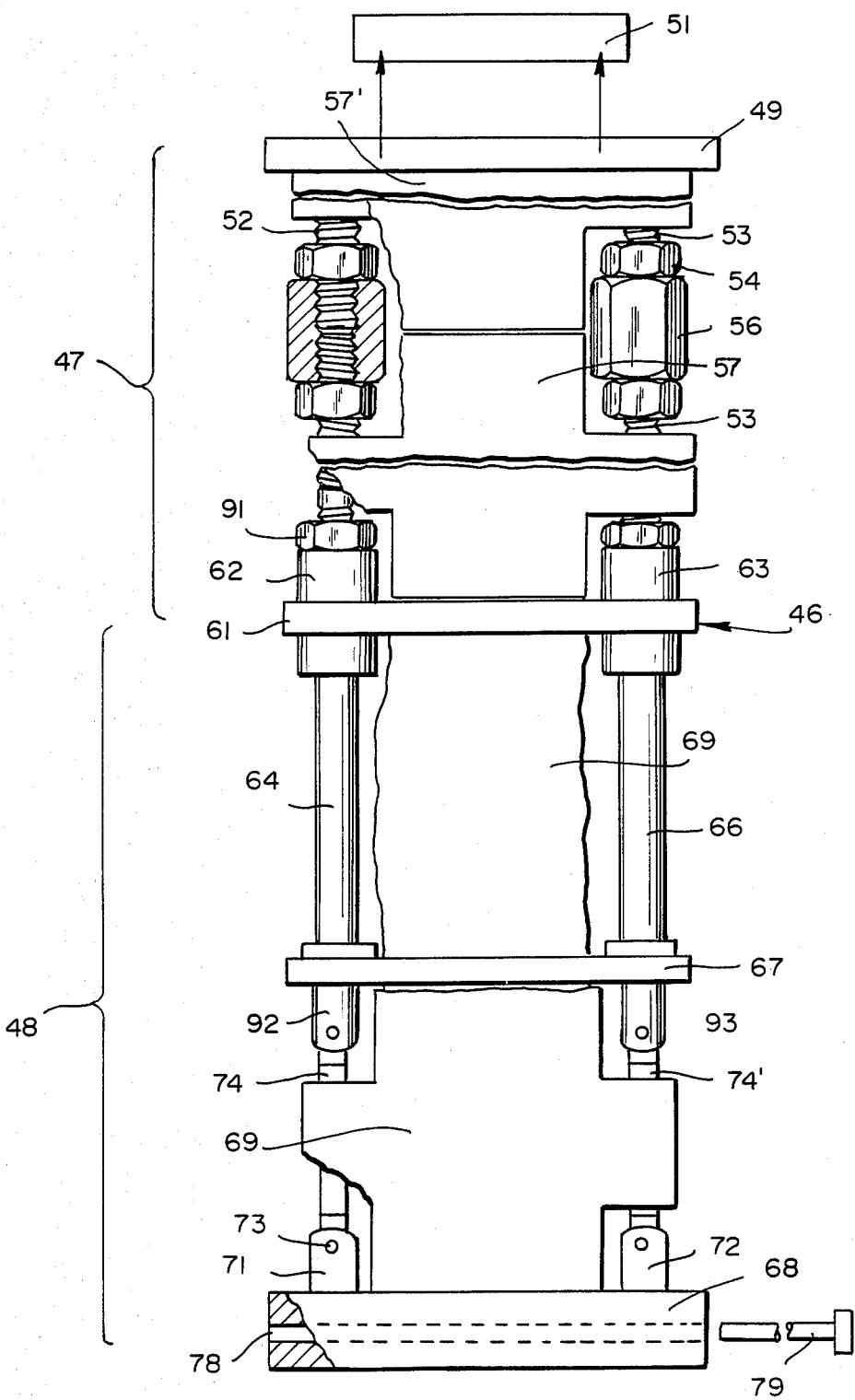
FIG. 5 is similar to FIG. 2, with the conductor section removed.

Conductor 18 therefore is provided internally with elongated baffle assembly 46 which serves primarily to segregate the cross sectional area of conductor into discrete longitudinal passages. As shown in FIGS. 3, 4, and 5, one embodiment of baffle assembly 46 includes a plurality of baffle panel sections 47 and 48 which are positioned within the conductor by a guide and tensioning system disposed longitudinally of the conductor. The height of the individual panel sections 47 and 48 is limited to permit easy handling thereof during installation at an offshore site.

Functionally, and particularly as shown in FIG. 4, baffle assembly 46 causes the respective parallel conduits 24, to be maintained physically separate and apart one from the other through the length of conductor 18. The various conduits will thus avoid entangelement and/or contact therebetween. Each of the installed conduits 24 is thereby confined, or at least limited to a discrete segment of the conductor 18.

Referring to FIG. 3, installation of the various conduits 24 into conductor 18 utilizes a cable pulling head 43 which is operable to removably clamp to the conduit 24 end. The pulling head further includes a cable or chain 44 which is adapted to engage a power winch or the like.

In that pulling head 43 is normally larger in diameter than conduit 24, it will experience difficulty in moving through the elongated baffle passages in conductor 18. To ease this longitudinal movement, baffle assembly 46 is constructed to engender a substantial degree of rigidity, yet exhibit enough flexibility or yieldability to avoid the pulling head becoming jammed or wedged.

Further, and referring to FIG. 2, as conduit 24 is pulled down and is caused to pass through passage 27 of the cable deflector section 26, the conduit will of necessity be bent into a curvature by contact with surface 36. This bending action will urge the conduit toward the wall of conductor 18 that is opposite to the deflector, or against the baffle assembly.

To avoid or minimize the possibility of damage to the various conduits, baffle 46 is constructed to be maintained in a tensioned condition. However, the lower end thereof includes a section that not only registers and guides the conduits, but is sufficiently compliant to allow the baffle section to be laterally displaced and thus facilitate passage of a conduit.

Baffle assembly 46 is shown in detail in FIG. 5, separate and apart from conductor 18 within which it is normally positioned. The baffle assembly comprises in essence two distinct portions, an upper section or subassembly 47, and a lower section or subassembly 48. Said two subassemblies are longitudinally engaged to define the continuous elongated baffle unit. Upper baffle portion 47 is comprised of a series of longitudinally connected segments which extend from the conductor upper end downwardly. Lower baffle section 48 constitutes the bottommost unit of the baffle assembly which provides the latter with a degree of lateral yieldability. It further serves as an anchoring element to fix the baffle lower end.

Operably, baffle assembly 46 is fixed at its lower end, preferably within deflecting insert 23. The baffle upper section 47 is tensionally positioned within conductor 18 being engaged in one embodiment to one or more tensioners 51 or to the conductor itself.

As shown in FIG. 5, baffle upper portion 47 as noted, is comprised of a series of individual, sequentially positioned baffle elements. The latter are of uniform and limited length to facilitate their transportation, storage and ready assembly into conductor 18 from the limited available area of deck 11.

Upper baffle assembly 47 includes a plurality of tension members such as 52 and 53 which are spaced in a manner to best support the baffles. Each tension member, 52 for example, includes preferably a metallic rigid rod fabricated of steel or a steel alloy. Said tension member can also be formed of a cable, or wire rope sections, to provide the desired elongated, continuous tensioning system which extends the length of conductor 18.

In the shown embodiment, each tension rod 52 is threaded at opposed ends and carries a lock nut 54. The respective rod ends are threadably engaged through a coupler 56 and are fixed in place by the lock nuts which are tightened thereagainst.

Figure 7:
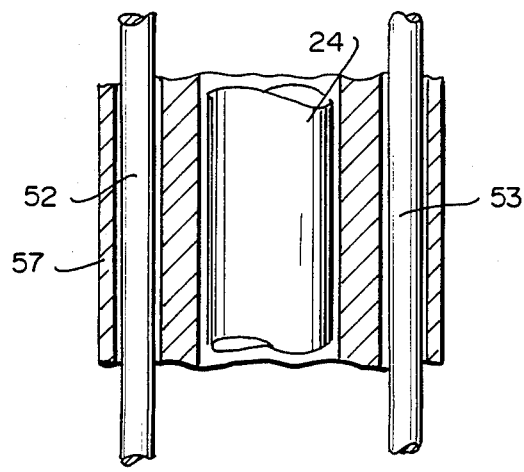
FIG. 7 is a cross-sectional view taken along line 7—7 of FIG. 4.

As shown, the tension members 52 and 53 slidably engage one or more baffle panels 57 and 57'. The one embodiment of the latter, as shown in FIGS. 4 and 7, is provided with bearing openings 84 and 85 within which said tension members 52 and 53 are slidably registered.

Each baffle section is contoured in a manner to define the elongated conduit passages or channels 58 and 59 which extend through conductor 18. The baffle further incorporates a plurality of tubular passages 55 and 60 which are sufficiently large to slidably register a conduit 24.

The respective baffle panels 57 are fabricated or molded of a suitable material which is sufficiently resilient to deform to a limited degree in response to the urging of a conduit 24 which is being pulled through one of the conduit's elongated passages by a pulling head 43. Thus, baffle panels 57 are formed of a material such as medium density polyethylene, or a fiberglass reinforced resin or plastic material.

Figure 8:
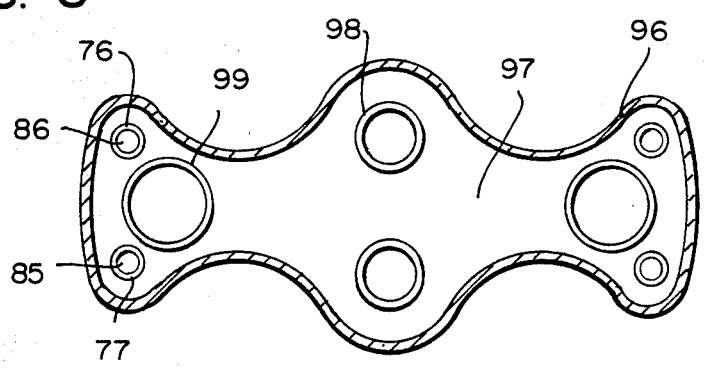
FIG. 8 is an enlarged cross-sectional view of a baffle member.

In the shown embodiment of FIG. 8, each baffle section is comprised of an outer skin or surface 96 formed of a moldable material such as polyethylene or a suitable reinforced plastic. To attain a degree of structural integrity while still remaining compliant, fiberglass fibers or other strengthening fibrous members can be incorporated into skin 96.

Outer skin 96 encloses a light, porous body 97 which is formed preferably of a syntactic or expandable foam. The latter serves as a buoyant factor to lessen the weight imposed on platform 10 as a result of being modified in the manner herein noted to accommodate the additional conduits 24.

As seen in FIG. 7, the expanded foam surrounds a plurality of tubular conduit guides 98 and 99 which are adapted to receive different sizes of conduits 24. A set of tension member sleeves 76 and 77 which register the respective tension rods is likewise embedded in the foam body 97.

During assembly and installation, each panel 57 and 57', as shown in FIG. 5, is slidably inserted or registered onto tension members 52 and 53 respectively. Thus, the sequentially positioned baffle sections are in abutment one to the other to define the elongated, continuous conduit passages therethrough.

Referring again to FIG. 5, the lower end of upper baffle section 47 is comprised of an intermediate base plate 61 having threaded fittings 62 and 63 thereon in alignment with the respective tension members 52 and 53. Thus, said plate 61 serves as an intermediate positioner for baffle upper section 47.

As in the instance of baffle sections 57 and 57' each tension member 52 and 53 is threadably engaged with a base fitting 62 and 63, and further held in place by a lock nut 91 which bears against the upper surface of said respective fittings.

The baffle lower section 48 is further provided with an intermediate segment comprising a plurality of rigid tension elements 64 and 66. Said elements threadably engage the underside of intermediate plate 61.

The lower end of said baffle segment 48 is comprised similarly of a sub-base plate 67 adapted to fixedly receive the respective tension members 64 and 66 to define a rigid structure which serves to support an additional baffle panel 69. In the instance of said panel 69, it too is similarly contoured to those hereinabove mentioned which define the various conduit passages and channels.

The lower segment or section 48 of the baffle assembly 64 is comprised of a foundation or anchor plate 68 which includes a plurality of fastening openings 78 into which fastening pins or bolts 79 are received. The latter in turn engage a wall of insert 23 to fixedly position said anchor plate 68, thereby fixing the baffle lower end.

The upper face of foundation member 68 is provided with a plurality of upright pivotal connectors 71 and 72 which receive a pin 73. The latter in turn operably engages tension uprights 74 and 74'. Said uprights as shown, are adapted at each end to be pinned to the respective connectors 71 and 72 thereby to form pivotal joints. The lower end of the baffle assembly 46 can thus be articulated laterally to a limited degree when subjected to a displacing force.

The upper end of the baffle 46 lower section is similarly engaged with intermediate plate 67 at a plurality of pivotal joints 92 and 93. Thus, the entire lower section of baffle 46 can be displaced laterally within conductor 18 in response to the passage of a conduit 24 therethrough, thereby assuring a smoother passage of both the conduit and the pulling head 43. Physically, the conduit 24 will register within or adjacent to foundation plate 68 and thereafter be bent or deflected outwardly through one of the deflecting shoe 26 channels within insert 23.

To place the baffle assembly 46 into functional condition after installation, tension is applied to each of the elongated tension members 52 and 53 which extend through the conductor 18 length whereby to fixedly position each of said members. While four such tension members are presently shown, the number needed to serve the instant purpose can be varied.

However, since lower section 48 of the baffle assembly 46 is pivotally connected to anchor plate 68, said plate, together with intermediate plate 67, define corresponding portions of a parallelogram that can be adjusted laterally in response to passage of a conduit and the bending thereof as the conduit is directed through the deflecting shoe 26.

Figure 6:
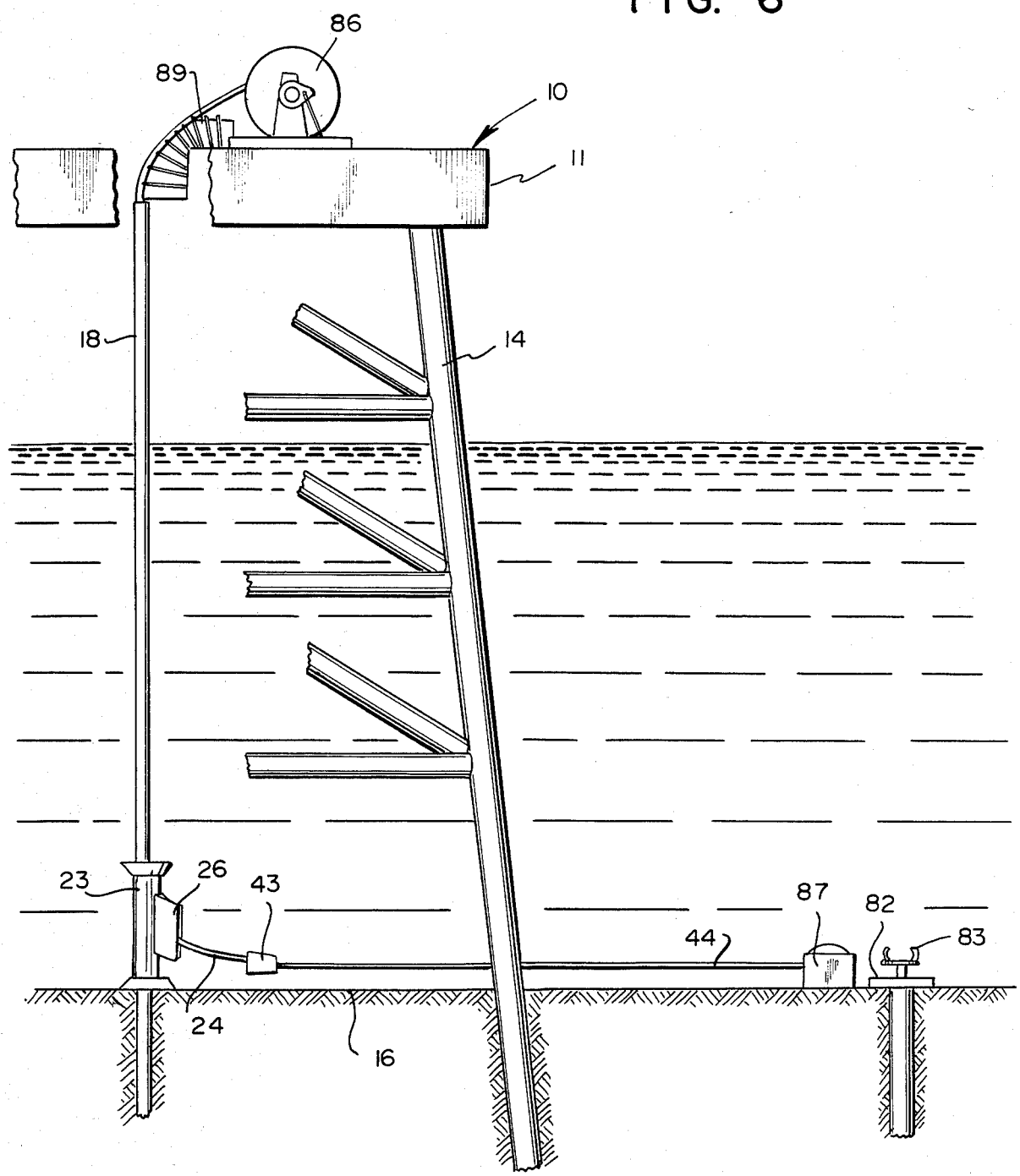
FIG. 6 is a segmentary view taken from FIG. 1.

In an illustrative embodiment of the instant apparatus and a preferred practice of the method, and referring to FIG. 6, one or more conduits 24, and generally a plurality thereof, are pulled individually from a conduit reel 86 on deck 11, and to the ocean floor 16 by way of the present conduit bending arrangement. When there are a plurality of dispersed sea floor wells 81 and 82, each will normally include a well head 83.

To remotely operate well head 83 or any such well head, the latter is provided with utility conduits including electrical and hydraulic, as well as fluid carrying conductors. Further, and as herein noted, each well head is provided with one or more of the conduits 24 which extend from said well head, to deck 11.

Preferably, the conduit 24, whether it be for utility use or for carrying product, is initially prewound and carried on reel 86 on deck 11. One way to effectuate the necessary conduit pulling action, is to provide a windup or a winching apparatus 87 at a point fixed to the ocean floor.

The pulling or messenger cable 44 which extends from winching apparatus 87, includes pulling head 43 at its remote end. The pulling head and the cable are initially positioned within conductor 18 in a specific longitudinal passage defined by baffle assembly 46. Pulling head 43 is next attached to the end of conduit 24 in a manner to unwind the latter from reel 86.

As a pulling force is applied to cable 44, it will draw conduit 24 from reel 86, across conduit guide means 89, and into a particular longitudinal passage or channel of baffle assembly 46. Conduit 24 will thereafter be further drawn into a passage of deflecting shoe 26 where it will be diverted in an outward direction as it bears against the shoe's curved surface.

Continued pull exerted by cable 44 will eventually position the end of conduit 24 such that it can be readily connected by divers either to well head 81, or to a corresponding pipeline at the sea floor 16.

In either event, when pulling cable 44 is detached, the flexible conduit 24 will assume a natural angle of inclination until it reaches and rests on ocean floor 16 in a usable position.

Although modifications and variations of the invention may be made without departing from the spirit and scope thereof, only such limitations should be imposed as are indicated in the appended claims.

We claim:

1. The combination with a marine structure fixed to the floor of an offshore body of water and including; a jacket having a plurality of legs which support a deck above the water's surface, and a plurality of tubular conductor guides within said jacket to guide a drill string from the said deck into the ocean floor, the lower ends of said plurality of conductor guides being embedded in said ocean floor, an insert member integral with at least one of said conductor guides and comprising:
a tubular casing disposed axially of said at least one conductor guide adjacent to the floor of said body of water,
a conduit deflecting shoe positioned in a wall of said casing to define transverse passages therethrough,
a compliant elongated conduit baffle assembly extending longitudinally of the said at least one conductor guide to define a plurality of discrete conduit passages which terminate upwardly from said transverse passages,
to permit registry of a flexible conduit which extends between the deck and the ocean floor into a discrete conduit passage, whereby to register in the respective conduit passages, a conduit which extends between said deck and the floor of the body of water.

2. In the combination as defined in claim 1, wherein said compliant elongated conduit baffle assembly includes;
   a baffle upper portion which is suspended within said conductor guide, and
   a baffle lower portion which operably depends from said upper portion to permit limited lateral displacement of a part of said baffle in response to the urging of a conduit being drawn along one of said discrete passages.

3. In the combination as defined in claim 2, wherein said baffle lower portion operably depends from the baffle upper portion at a plurality of pivotal joints.

4. In the combination as defined in claim 1, including; tension members extending longitudinally of said compliant elongated conduit baffle in supporting relation to the latter.

5. In the combination as defined in claim 4, wherein said tension members include; a plurality of spaced apart parallel tension members disposed about the conductor interior, and
   baffle panels are carried on the respective tension members to define said individual conduit passages.

6. In the combination as defined in claim 2, including; variable tensioning means engaging the baffle upper portion, being controllable to apply a desired tensional force to the conduit baffle assembly.

7. In the combination as defined in claim 5, wherein said tension columns include; a plurality of rigid elements end connected to define an elongated continuous length.

8. In the combination as defined in claim 4, wherein the tension members include; a plurality of wire ropes.

9. In the combination as defined in claim 5, wherein said baffle panels include; a body section which defines said passages, and bearing means being in said body aligned to slidably engage the parallel tension columns.

10. In the combination as defined in claim 5, wherein at least a pair of said baffle panels are contoured and disposed in cooperative relationship to each other to define conduit passages therebetween.

11. In the combination as defined in claim 5, wherein said baffle panels are contoured to define said passages and are formed of a pliable material to allow resilient movement of the conduit passage walls.

12. In the combination as defined in claim 11, wherein the baffle panels are formed of a plastic material.

13. In the combination as defined in claim 11, wherein the baffle panels are formed of glass reinforced resin.

14. Method for the in situ modification of a marine structure which is fixed to the floor of a body of water, and having a deck positioned above the water's surface, whereby to extend the functional utility of the structure by adapting it to receive conduits which reach from said deck to the floor of the body of water, which marine structure comprises; an elongated jacket disposed in supporting relation to said deck, and a plurality of tubular conductor guides within the jacket having the said conductor guides' upper ends adjacent to said deck and the lower ends thereof embedded in the floor of a body of water, which method includes the step of;
   severing one of said elongated conductor guides at a point adjacent to the floor of said body of water whereby to form discrete upper and lower segments thereof,
   axially separating said respective upper and lower segments to define a gap therebetween,
   interposing a tubular insert member into said gap to fixedly engage the respective upper and lower segments into a unitary conductor, said insert member including a conduit deflector shoe disposed in a wall thereof to form transverse passages whereby to direct conduits therethrough and onto the floor of said body of water.

15. In the method as defined in claim 14, wherein said tubular insert member is interposed intermediate the upper and lower segments by registering the tubular insert about the lower segment, and lowering the upper segment into registry with the tubular insert.

16. In the method as defined in claim 14, including the step of; grouting the annular end joints defined by registry of the upper and lower segments, respectively within the tubular insert.

17. In the method as defined in claim 14, including the step of; introducing an elongated conduit baffle assembly into the said conduit guide to define a plurality of discrete conduit passages longitudinally of the conductor.

18. In the method as defined in claim 17, including the step of; fixedly positioning one end of said elongated conductor baffle assembly within the conductor, and applying a tensional force to the baffle assembly opposed end.

* * * * *